US 6,735,289 B1

(12) United States Patent
Shanmugham

(10) Patent No.: US 6,735,289 B1
(45) Date of Patent: May 11, 2004

(54) DEVICES, METHODS AND SOFTWARES FOR TELECOMMUNICATION SERVICE PROVIDER TO RECEIVE FAX ON BEHALF OF SUBSCRIBER ON VOICE TELEPHONE LINE

(75) Inventor: Saravanan Shanmugham, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 10/005,001

(22) Filed: Dec. 3, 2001

(51) Int. Cl.[7] ............................................. H04M 11/00
(52) U.S. Cl. .............................. 379/93.09; 379/100.02; 379/100.15; 379/93.24
(58) Field of Search .................. 379/93.09, 100.02, 379/100.03, 100.05, 100.06, 100.07, 100.08, 100.09, 100.12, 100.15, 100.16, 100.17, 93.24

(56) References Cited

U.S. PATENT DOCUMENTS 4,994,926 A  2/1991  Gordon et al. ............... 358/400
5,291,302 A  3/1994  Gordon et al. ............... 358/400
6,167,123 A  * 12/2000  Kwok et al. ............ 379/100.01

FOREIGN PATENT DOCUMENTS

JP  406303276 A  * 10/1994 ........... H04L/29/04
JP  11-298868  * 10/1999 ........... H04N/7/14
JP  02001136337 A  * 5/2001 ........... H04N/1/00

* cited by examiner

*Primary Examiner*—Melur Ramakrishnaiah
(74) *Attorney, Agent, or Firm*—Marger Johnson & McCollom

(57) ABSTRACT

A routing switch made according to the invention is controlled by a Telephone Service Provider ("TSP"). Voice telephone calls of a subscriber with the new service are routed through the routing switch. To establish a telephone connection, the routing switch conferences two voice data paths, one of which leads to the subscriber. The routing switch further monitors the other incoming path, to detect whether a fax incoming tone appears. If it does, it unconferences the paths, and redirects the subsequent incoming fax signals to a fax receive utility. A fax is generated from the fax signals, for sending to the subscriber in a different way, e.g. as email attachment to a prearranged email address of the subscriber.

56 Claims, 3 Drawing Sheets

DEVICES, METHODS AND SOFTWARES FOR TELECOMMUNICATION SERVICE PROVIDER TO RECEIVE FAX ON BEHALF OF SUBSCRIBER ON VOICE TELEPHONE LINE

BACKGROUND OF THE INVENTION

1. Field of the Invention

The present invention is related to the field of services provided by Telecommunication Service Providers, and more specifically to devices, softwares and methods for receiving faxes on behalf of subscribers.

2. Description of the Related Art

The utility of having a facsimile ("fax") machine is well established. Fax machines use telephone lines to reproduce scanned images on paper. As such, fax machines facilitate communication between parties.

While the utility of faxes is well established, implementing their utility is cumbersome. Traditionally, a separate, standalone fax machine is needed, which works through a telephone line.

Regarding the fax machine, both parties must have a separate, standalone fax machine, which costs money, but only for receiving faxes. Indeed, commercial copying services permit sending faxes for very low cost per page. So, an individual needs to buy a fax machine to receive faxes. The expense may not justified for some individuals who might receive very few, e.g. 5 fax messages in a year.

Regarding the telephone line, an individual may use a home telephone line for both voice telephone calls and fax calls. This presents problems of setting up and of responding to calls. In some instances, an attendant needs to be present to answer an incoming call, and then redirect it to a fax machine if it is a fax call. These problems are sometimes addressed by establishing a second telephone line, and then dedicating it to the use of the fax machine. This costs additional money, and further requires the individual to communicate the telephone number of the second telephone line to those who might want to use it for faxing.

BRIEF SUMMARY OF THE INVENTION

The present invention overcomes these problems and limitations of the prior art.

Generally, the present invention provides devices, softwares and methods for Telecommunication Service Providers (TSPs) to offer a new service to their subscribers, possibly for a small fee. The new service is to receive faxes on behalf of their subscribers over the ordinary telephone line. Optionally, the received fax is then sent to the subscriber in a different way, e.g. as an email attachment to a prearranged email address.

A routing switch made according to the invention is controlled by a TSP. Voice telephone calls of a subscriber with the new service are routed through the routing switch. To establish a telephone connection, the routing switch conferences two voice data paths, one of which leads to the subscriber. The routing switch further monitors the other incoming path, to detect whether a fax incoming tone appears. If it does, the routing switch unconferences the paths, and redirects the subsequent incoming fax signals to a fax receive utility. A fax is generated from the fax signals, for sending to the subscriber in a different way.

The new service offers the advantage that someone need not install a fax machine to receive a fax. Nor do they have to acquire a second incoming telephone line. In fact, to receive a fax, they do not evn have to hang up on an established telephone connection, if one is made over a first line.

The arrangement does not require the subscribers to distribute a different, preassigned telephone number to those who might want to send a fax. With time, people will come to expect that a person's home telephone line is also their fax line.

The new service may be integrated with other services, such as call waiting. These and other features and advantages of the invention will become more readily apparent from the following Detailed Description, which proceeds with reference to the drawings, in which:

DETAILED DESCRIPTION OF THE PREFERRED EMBODIMENT(S)

As has been mentioned, the present invention provides devices, softwares and methods for Telecommunication Service Providers to receive faxes on behalf of their customers. The invention is now described in more detail.

For purposes of this document, a Telecommunication Service Provider ("TSP") is generally defined as an entity that sells connectivity and communication services to its customers, who are also known as subscribers. A TSP may be a telephone company ("telco"), or an Internet Service Provider ("ISP"), or a combination of both, etc.

Figure 1:
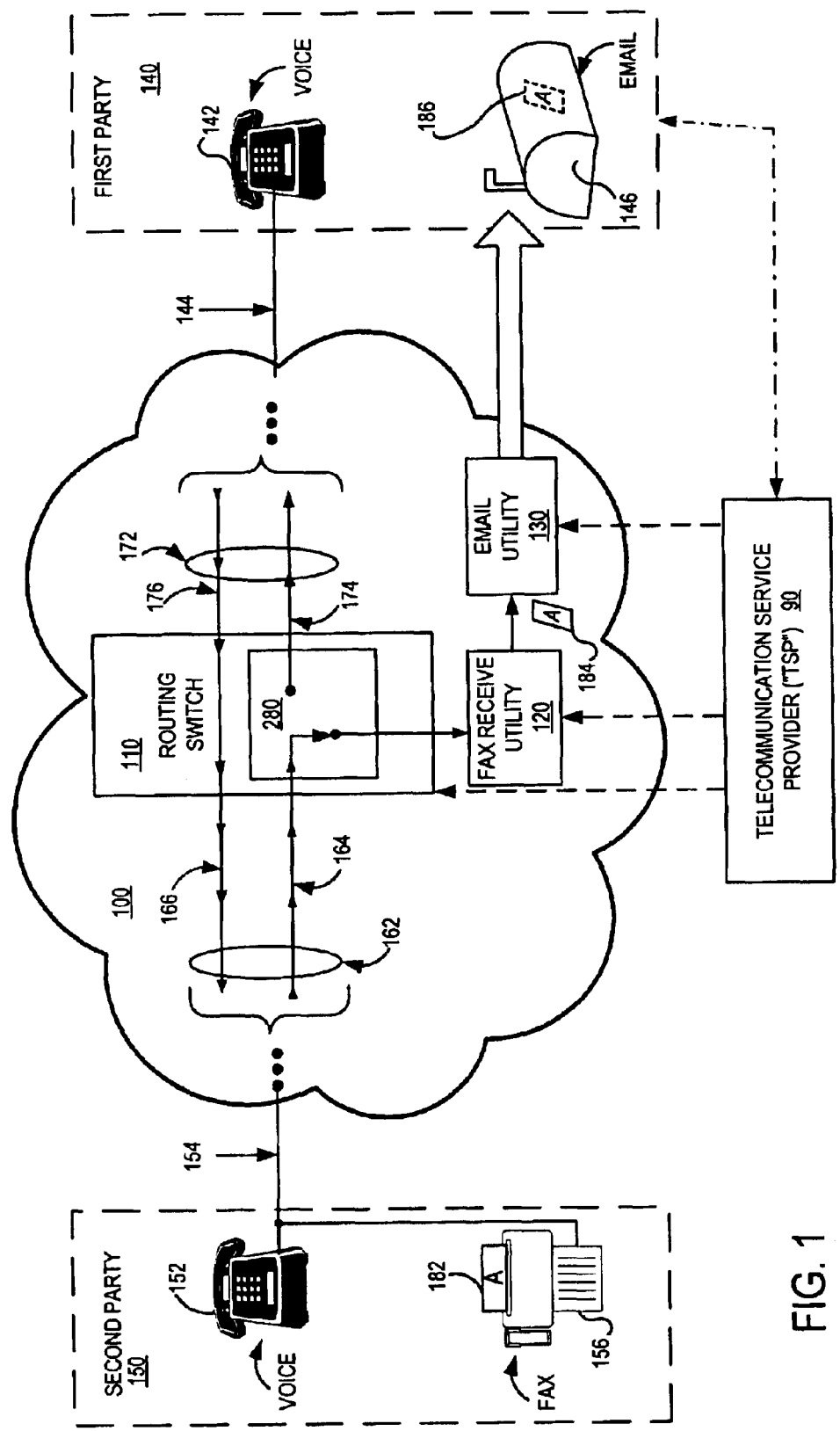
FIG. 1 is a diagram illustrating elements and uses of embodiments of the present invention.

Referring to FIG. 1, a TSP 90 is shown as a box 90. Arrows to and from box 90 indicate various types of relationships, as will be understood from the below.

A network 100 can be either a circuit switched telephone network ("telephone cloud"), or a packet switched network operable under an Internet Protocol ("IP cloud"), or a combination of both. Alternately, network 100 maybe a network of networks such as the world wide web, etc. Depending on the implementation, equivalent adjustments will have to be made, as will become apparent to a person skilled in the art.

A routing switch 110 is situated in network 100. Aspects, functions and details of routing switch 110 is described in more detail with reference to FIG. 2 below. Routing switch 110 is owned and/or operated by TSP 90.

A fax receive utility 120 and an email utility 130 may be located in or out of network 100, and their operation is described later in this document. They may be part of routing switch 110, or provided as separate functionalities. TSP 90 owns and/or operates fax receive utility 120 and email utility 130.

A first party 140 is a subscriber of TSP 90, or of an affiliated organization. The first party 140 has a telephone 142 with an associated telephone line 144 that goes into cloud 100.

When first party 140 opts for the new feature of the invention, TSP 90 routes the calls of first party 140 through routing switch 110. This will also catch fax signals, as will be seen below.

In addition, in the embodiment of FIG. 1, first party 140 has an email facility, such as an email box 146. The email address of email box 146 is known to email utility 130. This may take place by prearranged entry.

A second party 150 need not be a subscriber to TSP 90. In the event it is, some of the requisite adjustments are discussed below.

Second party 150 has a telephone 152 with an associated telephone line 154 that goes into cloud 100. Second party 150 also has a fax machine 156, which may be connected to the same telephone line as telephone 152. Equivalently, fax machine 156 may be implemented by a scanner and a fax utility of a personal computer, etc.

First party 140 may have a voice communication with second party 150 as follows. Either one of the two parties dials the telephone number of the line of the other. Then first party 140 speaks into telephone device 142, and second party 150 speaks into telephone device 152. Their voices become signals, and go through network 100.

In the event that network 100 is an IP cloud, then the voice signal also becomes packetized and depacketized for transmission.

When dialing the telephone number, a telephone call connection is established. This may be accomplished through routing switch 110 as follows. Routing switch 110 joins a two-way path 162 (which is connected to telephone 152) with a two-way path 172 (which is connected to telephone 142). This joining is second conferencing path 162 with path 172. Of these, path 172 leads to the subscriber first party 140.

If network 100 is a telephone cloud, then path 162 is a single wire, transmitting an analog electrical signal. This completes the voice call connection between telephones 152 and 142.

If network 100 is an IP cloud, then path 162 includes an incoming path 164 and an outgoing path 166, which may terminate in different ports of routing switch 110. In addition, path 172 includes an incoming path 174 and an outgoing path 176. The exact names of these paths are not critical; here they are considered from the point of view of subscriber 140, as serviced by TSP 90.

In this case, then, conferencing is twofold. Incoming path 164 is conferenced with incoming path 174, and outgoing path 176 is conferenced with outgoing path 166. This completes the voice call connection between telephones 152 and 142. As between paths 164 and 174, path 174 leads to the subscriber first party 140.

It is also possible to have network switch 110 at a border of a telephone cloud and an IP cloud. In that case, one of the paths is circuit switched, and the other one is packet switched.

Figure 2:
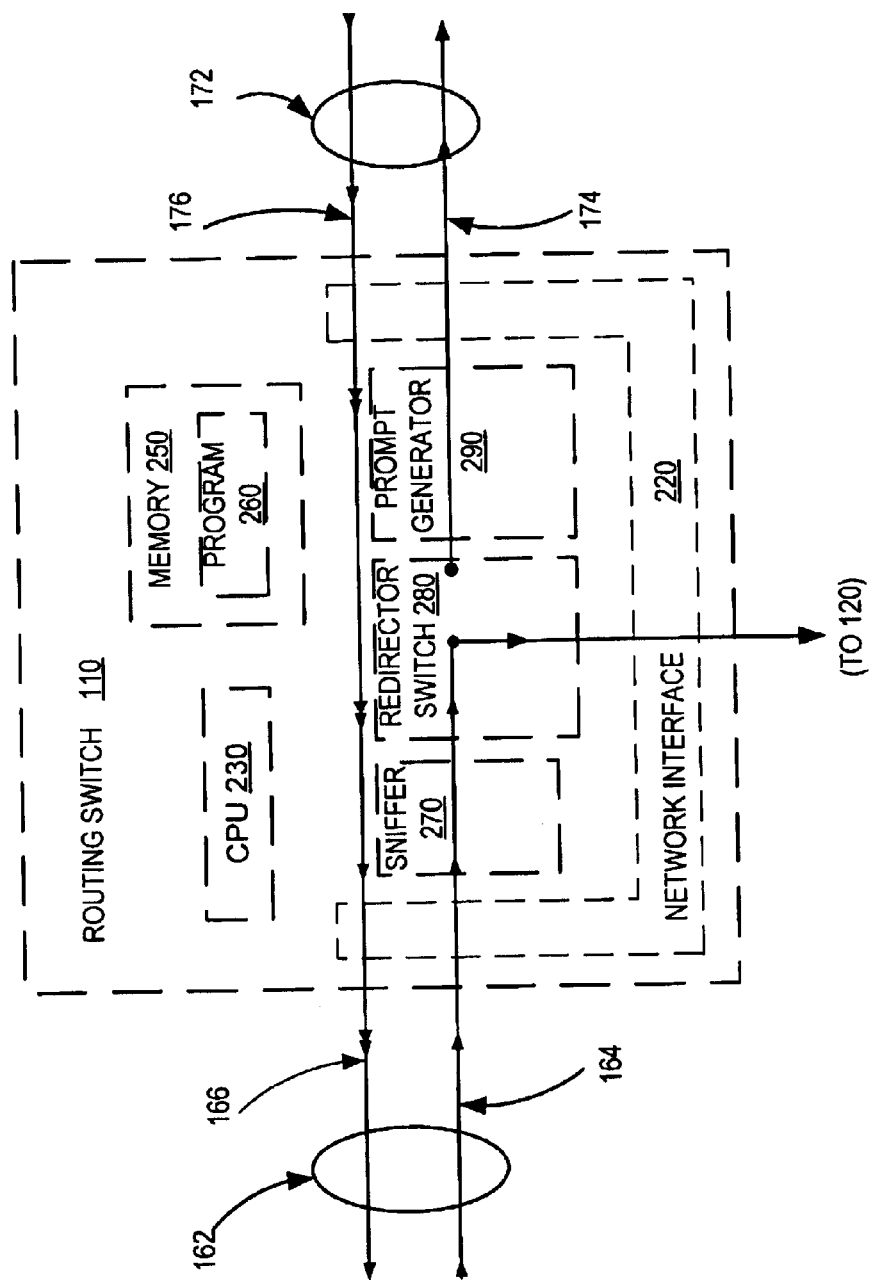
FIG. 2 is a block diagram of a routing switch of FIG. 1.

Referring now to FIG. 2, routing switch 110 made according to an embodiment of the invention is described in more detail. Switch 110 may be any suitable routing switch. Switch 110 may be directly connected to the telephone of first party 140, or in the middle of the path. In the embodiment of FIG. 2, switch 110 does not include fax receive utility 120 or email utility 130.

In the event that network 100 is an IP cloud, then switch 110 may be a router, a gateway, a bridge, a voice gateway, etc. It also has a network interface 220 for interfacing with a network, such as network 100.

In any event, switch 110 also has a processor 230, which is coupled with network interface 220 if the latter is provided. Processor 230 may be implemented as a Digital Signal Processor (DSP), Central Processing Unit (CPU), or any other equivalent way known in the art.

In the event that network 100 is an IP cloud, then processor 230 may include a codec 240.

In any event, switch 110 additionally includes a memory 250, on which a program 260 may reside. Functions of processor 230 may be controlled by program 260, as will become apparent from the below.

Features of switch 110 include a sniffer 270, a redirector switch 280 and a prompt generator 290. In the event that network 100 is a circuit switched network, sniffer 270 may be an analog detector. In the event that network 100 is an IP cloud, then sniffer 270 is a packet sniffer. In any event, sniffer 270 monitors data coming along incoming voice path 162 or 166 (depending on the application), to determine if there is an incoming fax tone. The important part is that the monitored path is the one that does not lead to the subscriber, but the other one, to detect what is coming to the subscriber.

Referring to both FIG. 1 and FIG. 2, an operation of the invention is described.

Second party 150 may choose to fax a sheet 182 to first party 140, even while they have established the voice connection. Second party 150 connects fax machine 156 to line 154, places sheet 182 in fax machine 156, and pushes the "START" button. This generates an incoming fax tone, which is transmitted to routing switch 110.

As seen above, sniffer 270 will detect the incoming fax tone. Responsive to the detection, redirector switch 280 unconferences path 164 from path 174, while optionally preserving the established telephone connection. Alternately, unconferencing may take place at a different module.

Redirector switch 280 then redirects data from path 164 to fax receive utility 120. Fax receive utility 120 may be a libretto style fax. The subsequently incoming fax data will generate a set of data 184, which are a fax-encoded version 184 of sheet 182.

Then email utility 130 receives set of data 184, and emails it to email box 146 as an attachment 186. This way first party 140 receives the fax, without needing a fax machine.

Then redirector switch 280 optionally conferences again path 164 with path 174. This permits the parties to resume their voice conversation, without ever having lost the connection.

Referring to FIG. 2, prompt generator 290 generates and transmits prompts. A first, real time prompt to first party 140 may be a tone, or a voice message that a fax is incoming, and from which telephone number. A second, confirmation prompt may be about the completed emailed fax, along with number of pages, etc. The second prompt may be to both parties.

It will be understood that, if second party 150 is also a subscriber, an additional sniffer (not shown), additional redirector (not shown), and an additional prompt generator (not shown) may be implemented for its benefit. They would operate in the event that first party 140 faxes something to second party 150. In that case, both paths would be sniffed, etc.

The present invention may be implemented by one or more devices that include logic circuitry. The device performs functions and/or methods as are described in this document. The logic circuitry may include a processor that may be programmable for a general purpose, or dedicated, such as microcontroller, a microprocessor, a Digital Signal Processor (DSP), etc. For example, the device may be a digital computer like device, such as a general-purpose computer selectively activated or reconfigured by a computer program stored in the computer.

Moreover, the invention additionally provides methods, which are described below. The methods and algorithms presented herein are not necessarily inherently associated with any particular computer or other apparatus. Rather, various general-purpose machines may be used with programs in accordance with the teachings herein, or it may prove more convenient to construct more specialized apparatus to perform the required method steps. The required structure for a variety of these machines will become apparent from this description.

In all cases there should be borne in mind the distinction between the method of the invention itself and the method of operating a computing machine. The present invention relates both to methods in general, and also to steps for operating a computer and for processing electrical or other physical signals to generate other desired physical signals.

The invention additionally provides programs, and methods of operation of the programs. A program is generally defined as a group of steps leading to a desired result, due to their nature and their sequence. A program made according to an embodiment of the invention is most advantageously implemented as a program for a computing machine, such as a general-purpose computer, a special purpose computer, a microprocessor, etc.

The invention also provides storage media that, individually or in combination with others, have stored thereon instructions of a program made according to the invention. A storage medium according to the invention is a computer-readable medium, such as a memory, and is read by the computing machine mentioned above.

The steps or instructions of a program made according to an embodiment of the invention requires physical manipulations of physical quantities. Usually, though not necessarily, these quantities may be transferred, combined, compared, and otherwise manipulated or processed according to the instructions, and they may also be stored in a computer-readable medium. These quantities include, for example electrical, magnetic, and electromagnetic signals, and also states of matter that can be queried by such signals. It is convenient at times, principally for reasons of common usage, to refer to these quantities as bits, data bits, samples, values, symbols, characters, images, terms, numbers, or the like. It should be borne in mind, however, that all of these and similar terms are associated with the appropriate physical quantities, and that these terms are merely convenient labels applied to these physical quantities, individually or in groups.

This detailed description is presented largely in terms of flowcharts, display images, algorithms, and symbolic representations of operations of data bits within at least one computer readable medium, such as a memory. An economy is achieved in the present document in that a single set of flowcharts is used to describe both methods of the invention, and programs according to the invention. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the present invention.

Often, for the sake of convenience only, it is preferred to implement and describe a program as various interconnected distinct software modules or features, individually and collectively also known as software and softwares. This is not necessary, however, and there may be cases where modules are equivalently aggregated into a single program with unclear boundaries. In any event, the software modules or features of the present invention may be implemented by themselves, or in combination with others. Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network, such as a local access network (LAN), or a global network, such as the Internet.

It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed in a control plane, which accordingly may update the local routing table, in addition to neighboring ones. A person skilled in the art will discern which step is best performed in which plane.

In the present case, methods of the invention are implemented by machine operations. In other words, embodiments of programs of the invention are made such that they perform methods of the invention that are described in this document. These may be optionally performed in conjunction with one or more human operators performing some, but not all of them. As per the above, the users need not be collocated with each other, but each only with a machine that houses a portion of the program. Alternately, some of these machines may operate automatically, without users and/or independently from each other.

Methods of the invention are now described. It will be appreciated that some of these methods may include software steps which may be performed by different modules of an overall parts of a software architecture. For example, data forwarding in a router may be performed in a data plane, which consults a local routing table. Collection of performance data may also be performed in a data plane. The performance data may be processed, and accordingly used in a control plane to update the local routing table, in addition to neighboring ones. A person skilled in the art will discern which step is best performed in which plane.

Figure 3:
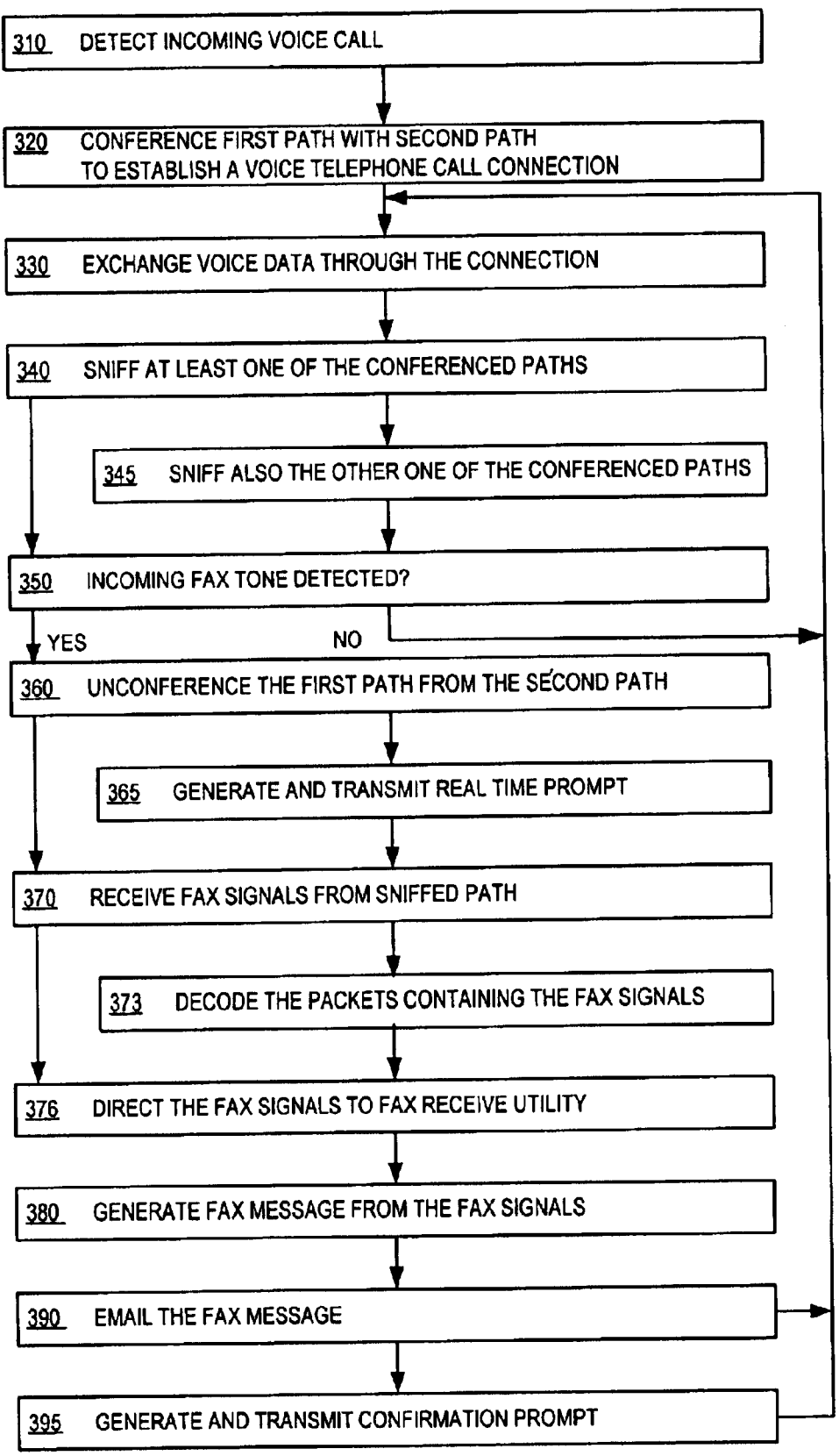
FIG. 3 is a flowchart illustrating methods according to an embodiment of the present invention.

Referring now to FIG. 3, a flowchart 300 is used to illustrate a method according to an embodiment of the invention. The method of flowchart 300 may also be practiced by routing switch 110.

According to a box 310, an incoming voice call is detected. This may be performed by either the party receiving the special service of the invention, or a calling outside party.

According to a next box 320, a first path is conferenced with a second path, to establish a voice telephone call connection pursuant to the incoming voice call. One of the two paths leads to the telephone of the party receiving the special service of the invention.

According to an optional next box 330, voice data is exchanged through the connection. Box 330 is optional in that, if only a fax call were intended over the voice line, then voice data is not exchanged at all.

According to a next box 340, at least one of the conferenced paths is sniffed. The sniffed path is the one incoming to the subscriber with the special service of the invention.

According to an optional next box 345, the other one of the conferenced paths is also sniffed. That is in the case that both parties enjoy the service of the invention.

According to a next box 350, it is inquired whether an incoming fax tone is detected. If not, execution returns to box 330.

If yes, then according to a next box 360, the first path is unconferenced from the second path.

According to an optional next box 365, a real time prompt is generated and transmitted. The real time prompt may be a tone, for example integrated with a call waiting feature. Or it may be a voice message, which includes an identifying feature of the sniffed path, from which the fax signals will be coming. Such a feature may be the telephone number of the sniffed path. The real time prompt is transmitted to the party receiving the service, preferably via the non-sniffed one of the paths.

According to a next box 370, fax signals are received from the sniffed path.

According to an optional next box 373, the packets containing the fax signals are decoded, in the case that the method takes place in an IP environment.

According to a next box 376, the fax signals are directed to a fax receive utility.

According to a next box 380, a fax message is generated from the fax signals. This is generated from the fax receive utility.

According to an optional next box 390, the fax message is emailed. Execution may then return to box 330. Alternately, according to an optional next box 395, a confirmation prompt is generated and transmitted.

A person skilled in the art will be able to practice the present invention in view of the description present in this document, which is to be taken as a whole. Numerous details have been set forth in order to provide a more thorough understanding of the invention. In other instances, well-known features have not been described in detail in order not to obscure unnecessarily the invention.

While the invention has been disclosed in its preferred form, the specific embodiments as disclosed and illustrated herein are not to be considered in a limiting sense. Indeed, it should be readily apparent to those skilled in the art in view of the present description that the invention may be modified in numerous ways. The inventor regards the subject matter of the invention to include all combinations and subcombinations of the various elements, features, functions and/or properties disclosed herein.

The following claims define certain combinations and subcombinations, which are regarded as novel and non-obvious. Additional claims for other combinations and subcombinations of features, functions, elements and/or properties may be presented in this or a related document.

The invention claimed is:

1. A device comprising:
   a central processing unit (CPU) for connecting a first circuit switched path with a second circuit switched path to establish a voice telephone call connection;
   a first detection circuit for detecting an incoming fax tone on at least one of the first or second circuit switched paths;
   a redirector switch for disconnecting the first circuit switched path from the second circuit switched path, if the incoming fax tone is detected; and
   a fax receive utility for converting a faxed document from at least one of the disconnected first or second path into an electronic mail (email) message and transmitting the email message containing the faxed document over a packet switched connection.

2. The device of claim 1, further comprising:
   a second sniffer for sniffing the other one of the conferenced paths.

3. The device of claim 1, further comprising:
   a prompt generator for generating a real time prompt responsive to the incoming fax tone.

4. The device of claim 3, in which
   the real time prompt is one of a tone and a voice message.

5. The device of claim 3, in which
   the real time prompt includes an identifying feature of the sniffed path.

6. The device of claim 1, further comprising:
   a prompt generator for generating a confirmation prompt about the emailed fax message.

7. A device comprising:
   a network interface for coupling to a network;
   a processor coupled with the network interface adapted to conference a first path with a second path to establish a voice telephone call connection and sniff at least one of the conferenced paths to detect an incoming fax tone, if the incoming fax tone is detected the processor disconnecting the first path from the second path; and
   a fax receive utility adapted to convert fax signals for a faxed document from at least one of the disconnected first or second path into an electronic mail (email) message.

8. The device of claim 7, in which the processor is further adapted to:
   generate and transmit a real time prompt responsive to the incoming fax tone.

9. The device of claim 8, in which
   the real time prompt is transmitted via the non-sniffed one of the paths.

10. The device of claim 8, in which
    the real time prompt is one of a tone and a voice message.

11. The device of claim 8, in which
    the real time prompt includes an identifying feature of the sniffed path.

12. The device of claim 7, in which the processor is further adapted to:
    generate and transmit a confirmation prompt about the emailed fax message.

13. The device of claim 7, in which the processor is further adapted to:
    then resume exchanging voice data through the connection.

14. A device comprising:
    means for connecting a first path with a second path to establish a voice telephone call connection;
    means for detecting an incoming fax tone on at least one of the conferenced paths;
    means for disconnecting the first path from the second path, if the incoming fax tone is detected;
    means for diverting at least one of the first or second paths to an electronic mail (email) path; and
    means for converting documents encoded as a fax message on at least one of the disconnected first or second paths into email and sending the email over the email path.

15. The device of claim 14, in which
    the first path and the second path are part of a circuit switched connection and the email path is a packet switched connection.

16. The device of claim 14, in which
at least one of the first path and the second path is part of a packet switched connection.

17. The device of claim 14, in which
the sniffed path is part of a packet switched connection, and
further comprising means for decoding packets arriving through the sniffed path.

18. The device of claim 14, further comprising:
means for exchanging voice data between the conferenced paths through the connection prior to sniffing.

19. The device of claim 14, further comprising:
means for also sniffing the other one of the conferenced paths.

20. The device of claim 14, further comprising:
means for generating and transmitting a real time prompt responsive to the incoming fax tone.

21. The device of claim 20, in which
the real time prompt is transmitted via the non-sniffed one of the paths.

22. The device of claim 20, in which
the real time prompt is one of a tone and a voice message.

23. The device of claim 20, in which
the real time prompt includes an identifying feature of the sniffed path.

24. The device of claim 14, further comprising:
means for receiving fax signals from the sniffed path; and
means for directing the received fax signals to a fax receive utility.

25. The device of claim 24,
in which the received fax signals are in fax packets,
and further comprising:
means for decoding the fax packets.

26. The device of claim 14, further comprising:
means for generating and transmitting a confirmation prompt about the emailed fax message.

27. The device of claim 14, further comprising:
means for then resuming exchanging voice data through the connection.

28. An article comprising: a storage medium, the storage medium having instructions stored thereon, in which when the instructions are executed by at least one device, they result in:
conferencing a first path with a second path to establish a voice telephone call connection;
after the connection is established, sniffing at least one of the conferenced paths to detect an incoming fax tone;
if the incoming fax tone is detected, unconferencing the first path from the second path;
diverting at least one of the first or second path to an electronic mail (email) path; and
converting documents encoded as facsimile signals on at least one of the disconnected first or second paths into email and sending the email over the email path.

29. The article of claim 28, in which
the first path and the second path are part of a circuit switched connection and the email path is a packet switched connection.

30. The article of claim 28, in which
at least one of the first path and the second path is part of a packet switched connection.

31. The article of claim 28, in which
the sniffed path is part of a packet switched connection, and
further comprising decoding packets arriving through the sniffed path.

32. The article of claim 28, in which the instructions further result in:
exchanging voice data between the conferenced paths through the connection prior to sniffing.

33. The article of claim 28, in which the instructions further result in:
sniffing also the other one of the conferenced paths.

34. The article of claim 28, in which the instructions further result in:
generating and transmitting a real time prompt responsive to the incoming fax tone.

35. The article of claim 34, in which
the real time prompt is transmitted via the non-sniffed one of the paths.

36. The article of claim 34, in which
the real time prompt is one of a tone and a voice message.

37. The article of claim 34, in which
the real time prompt includes an identifying feature of the sniffed path.

38. The article of claim 28, in which the instructions further result in:
receiving fax signals from the sniffed path; and
directing the received fax signals to a fax receive utility.

39. The article of claim 38,
in which the received fax signals are in fax packets,
and in which the instructions further result in:
decoding the fax packets.

40. The article of claim 38, in which the instructions further result in:
generating a fax message from the directed fax signals; and
emailing the fax message.

41. The article of claim 40, in which the instructions further result in:
generating and transmitting a confirmation prompt about the emailed fax message.

42. The article of claim 40, in which the instructions further result in:
then resuming exchanging voice data through the connection.

43. A method comprising:
conferencing a first path with a second path to establish a voice telephone call connection;
after the connection is established, sniffing at least one of the conferenced paths to detect an incoming fax tone; and
if the incoming fax tone is detected, unconferencing the first path from the second path;
diverting at least one of the first or second path to an electronic mail (email) path; and
converting documents encoded as fax messages on at least one of the disconnected first or second paths into an email and sending the email over the email path.

44. The method of claim 43, in which
the first path and the second path are part of a circuit switched connection and the email path is a packet switched connection.

45. The method of claim 43, in which
at least one of the first path and the second path is part of a packet switched connection.

46. The method of claim 43, in which the sniffed path is part of a packet switched connection, and further comprising decoding packets arriving through the sniffed path.

47. The method of claim 43, further comprising:

exchanging voice data between the conferenced paths through the connection prior to sniffing.

48. The method of claim 43, further comprising:

sniffing also the other one of the conferenced paths.

49. The method of claim 43, further comprising:

generating and transmitting a real time prompt responsive to the incoming fax tone.

50. The method of claim 49, in which the real time prompt is transmitted via the non-sniffed one of the paths.

51. The method of claim 49, in which the real time prompt is one of a tone and a voice message.

52. The method of claim 49, in which the real time prompt includes an identifying feature of the sniffed path.

53. The method of claim 43, further comprising:

receiving fax signals from the sniffed path; and directing the received fax signals to a fax receive utility.

54. The method of claim 53, in which the received fax signals are in fax packets, and further comprising:

decoding the fax packets.

55. The method of claim 43, further comprising:

generating and transmitting a confirmation prompt about the emailed fax message.

56. The method of claim 43, further comprising:

then resuming exchanging voice data through the connection.

* * * * *